US007656534B2

(12) United States Patent
Cardoso Vieira et al.

(10) Patent No.: US 7,656,534 B2
(45) Date of Patent: Feb. 2, 2010

(54) SYSTEM FOR AUTOMATIC DETECTION OF FOREST FIRES THROUGH OPTIC SPECTROSCOPY

(75) Inventors: Pedro Manuel Cardoso Vieira, Quinta do Anjo (PT); João Pedro Roque Matos, Lisbon (PT)

(73) Assignee: Faculdade de Ciencias e Tecnologia da Univeridade Nova de Lisboa, Monte da Caparica (PT)

( * ) Notice: Subject to any disclaimer, the term of this patent is extended or adjusted under 35 U.S.C. 154(b) by 112 days.

(21) Appl. No.: 11/994,711

(22) PCT Filed: Jul. 7, 2006

(86) PCT No.: PCT/PT2006/000017

§ 371 (c)(1), (2), (4) Date: Mar. 27, 2008

(87) PCT Pub. No.: WO2007/008095

PCT Pub. Date: Jan. 18, 2007

(65) Prior Publication Data

US 2008/0198025 A1 Aug. 21, 2008

(30) Foreign Application Priority Data

Jul. 7, 2005 (PT) ..................................... 103304

(51) Int. Cl.
*G01N 21/00* (2006.01)
*G02B 26/10* (2006.01)

(52) U.S. Cl. ...................................... 356/438; 250/334

(58) Field of Classification Search ......... 356/432–448; 250/332–334

See application file for complete search history.

(56) References Cited

U.S. PATENT DOCUMENTS 4,533,834 A 8/1985 McCormack
5,453,618 A * 9/1995 Sutton et al. ................ 250/334
7,164,468 B2 * 1/2007 Correia Da Silva Vilar et al. ........................... 356/10

FOREIGN PATENT DOCUMENTS

EP 1528520 5/2004
FR 2643173 8/1990
WO WO 2004/008407 1/2004

* cited by examiner

*Primary Examiner*—Michael P Stafira
(74) *Attorney, Agent, or Firm*—Mark Montague; Cowan Liebowitz & Latman, P.C.

(57) ABSTRACT

The present invention relates to a system for detection of forest fires, based on the chemical analysis of the atmosphere through optic spectroscopy. The smoke originated from a fire has a chemical composition different from that of a normal atmosphere. This chemical composition is determined by the analysis of light absorption, which passes through the smoke, in its different wavelengths, carried out by a spectrometer. In this case, the spectrometer is associated to a telescope and solar light is used as the light source allowing the detection of smoke originated from a fire in a specific area of the horizon. The maximum distance from which the smoke can be detected depends only on the potency of the telescope and may be of many kilometers. The installation of the system on a rotating support and the use of computational logarithms makes the detection in any point of the horizon possible, a completely autonomous way.

7 Claims, 1 Drawing Sheet

SYSTEM FOR AUTOMATIC DETECTION OF FOREST FIRES THROUGH OPTIC SPECTROSCOPY

OBJECT

The present invention relates to a completely automatic and autonomous system for the detection of forest fires based on the analysis of the spectrum in the area of visible and atmospheric infrared when there is smoke caused by forest fires. By means of comparison between the "normal" spectrum in the atmosphere and the spectrum resulting from combustion smoke it is possible to verify alterations in the absorption patterns. For such, solar radiation is used as a source of lighting, a telescope to restrict the horizon area to be analyzed, a spectrometer that analyses the atmospheric sample collected by the telescope and a computer that makes the necessary calculations and comparisons to determine whether there is a fire situation.

The system is installed on an observation tower with good visibility over the horizon, and performs a rotation in order to cover an area of large dimensions. The whole detection process is carried out in situ having communication with a control center only in case of fire.

PRIOR ART

There are various technologies for the detection of forest fires based on the following principles.

- Placement of observers at observation posts strategically positioned. After observation of an event the observer sends information to a control center. Although technologically simple to implement, significant human resources are required, which makes it difficult to be put into practice.
- Optical or infrared cameras placed in observation posts strategically positioned. An image is transmitted in real time to a control center where an observer monitors a set of cameras. This is a system of intermediate technological complexity having as greatest limitations: the required means to transmit an image in real time and the fact that it depends on an observer to activate the alarm in case of fire.
- Optical or infrared cameras placed in observation posts strategically positioned. The fire detection is made automatically by use of computational algorithms that analyze the images. When the fire is detected, an alarm signal is sent to the control center. The development of this system has been limited by the complexity of the required algorithms, which leads to the generation of an excessively high number of false positives to be of practical use.
- LIDAR Systems (Light Detection and Ranging), in which a laser beam illuminates the point in the horizon that is to be observed and the light reflected by it is detected and analyzed. This system is generally used to carry out chemical detection from great distances and has the potential to be an efficient system for forest fire detection, however, it requires the lighting of the horizon with a laser beam which causes public health risks, besides not being feasible from the economic point of view for most applications.

DESCRIPTION OF THE DRAWING

1. Represents a mirror installed over the main lens of the telescope (2) capable of performing a 360° rotation and azimuth adjustment. The function of this mirror is to redirect the light gathered from the horizon into the interior of the telescope.

2. Represents the telescope with the eyepiece modified so that the light gathered is transmitted by means of an optical fiber (3). Its function is to collect light from a small section of the horizon, which will be analyzed by the spectrometer (4). The telescope is mounted in the vertical position in order to make its mechanical assembly easy.

Figure 1:
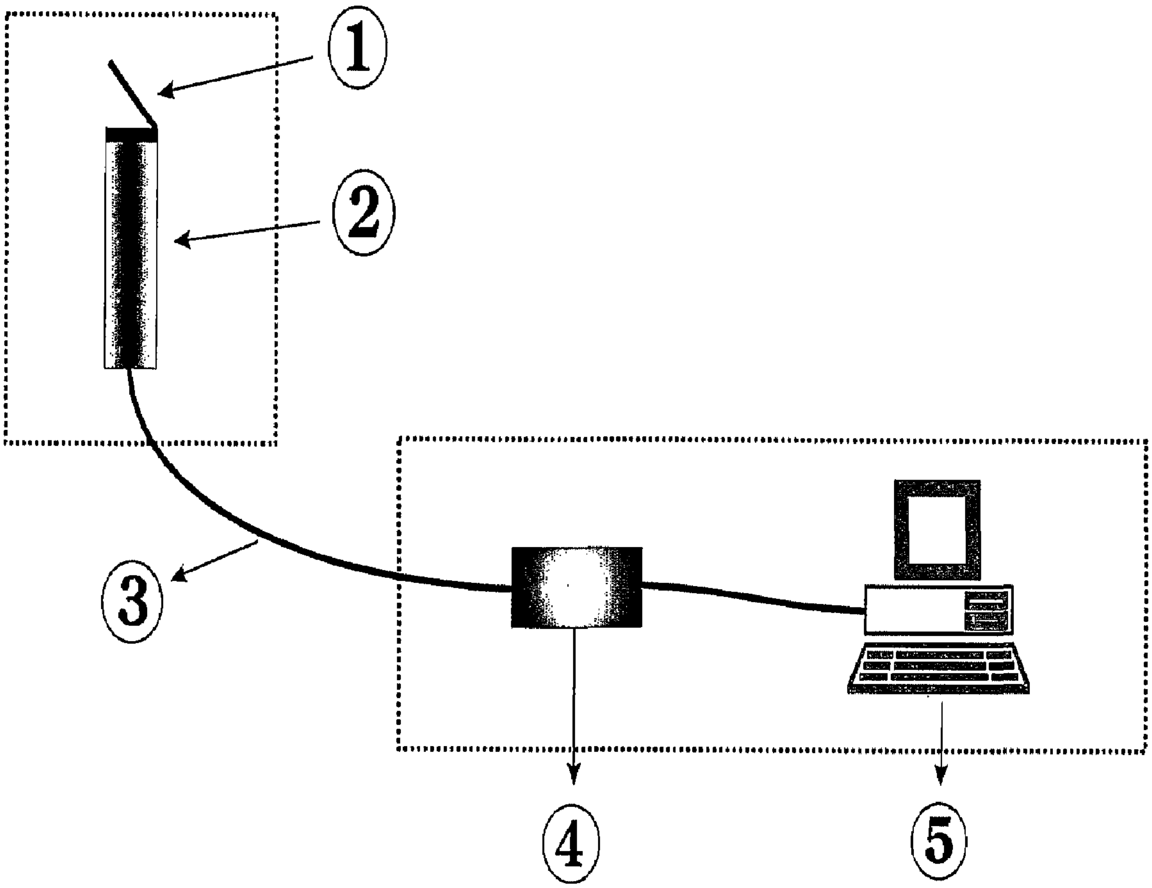

3. Represents the optical fiber that transmits the light collected by the telescope (2) to the spectrometer, which analyzes the light. It can be various meters long, which allows the physical separation of the detection systems (1+2) from the analysis systems (4+5).

4. Represents the spectrometer. It has the function of performing a spectral analysis of the light received by the telescope (2), that is, to separate the light in its primary components and determine the intensity of each one of these components. This information is scanned and transferred to the computer (5).

5. Represents the computer. It has the function of performing the analysis of the information provided by the spectrometer at each moment and to determine whether or not there is an event that can be considered to be a fire. In the case of a fire, it is the computer that starts the alarm process.

DESCRIPTION OF FUNCTIONING

The functioning methodology is based on the fact that the chemical composition of the smoke originated from a fire has a different chemical composition from that of a normal atmosphere. In order to determine the chemical composition of a gas sample, the sample can be lit with a certain light source and then observe which wavelengths were absorbed. The analysis of this absorption by use of a spectrometer (4) provides a signature of the chemical composition of the analyzed sample. In the present case, the solar radiation that will pass through the smoke originated in a fire can be used as a light source. As the normal sun spectrum is known and by knowing which wavelengths were absorbed at a certain height it is possible to detect fires in an effective and efficient manner.

There are, however, some technological solutions that must be implemented, since the spectrometer alone does not discriminate the area in the horizon where the presence of smoke is to be verified. For this purpose, it is necessary for a specific optical system to exist which is capable of observing only the area of interest in the horizon, with a suitable range that can reach many kilometers and that can, somehow, transmit the detected light to the spectrometer.

The optical system comprises a telescope with a modified eyepiece (2) in order for the detected light to be transmitted by means of an optical fiber (3) to the spectrometer. The fact that an optical fiber is used for the connection between these two apparatus has the advantage that it is not necessary that they are in physical proximity to one another. For example, it is possible to place only the telescope on the observation tower and the rest of the system, including the spectrometer, at the base of this tower.

The light detected by the telescope is analyzed by the spectrometer in its different wavelengths, and the information is sent to a computer (5) where the analyzed spectrum is verified for characteristics corresponding to an event of fire.

The automatic analysis of the measured spectrum at a given moment is carried out as follows:

In a laboratory, or in a controlled fire situation, the difference between the light source spectra (solar radiation) is determined when it is directly observed and when this light passes through smoke originated from a fire. Thus, the so-called standard difference spectrum is obtained. This spectrum only needs to be determined once and it is independent from the light source used.

For the spectrum measured at a given moment of a specific location of the horizon, follows its subtraction by what would be expectable in a non-fire situation. Thus the so-called difference spectrum is obtained.

The standard difference spectrum is compared to the difference spectrum using for such purpose the mathematical operator correlation coefficient. In the case that the coefficient between the two spectra is above a predefined threshold, it means that its similarity is such that the event can be considered as a fire, the alarm process being activated.

The detection system must have the capability to observe the whole horizon, whereby the optical system has rotation capacity and azimuth adjustment and it is assembled on a structure above obstacles that may obstruct the observation. In order to reduce to a minimum the number of movable pieces and to increase the reliability of the system, the telescope is fixed and assembled in a vertical position. Above it a rotating mirror with azimuth adjustment (1) is installed, which allows the orientation of the luminous radiation originated from different positions of the horizon to the telescope. These are examples of types of structure where the system, the observation towers or the posts of operators' mobile communication must be installed.

For the precise position of where the fire is located, it is necessary to provide two types of information: The direction and the distance of the event in relation to the observation tower. The direction is simply determined by the angle of the mobile mirror at the moment of detection. The distance of the event can be determined from the following manners already known:

In case the event can be observed by more than one observation tower and the direction of the detection of each one of these towers is known, the exact location, including the distance, can be determined by the triangulation method (US2004239912).

In case the event is detected by a single observation tower and the surrounding relief is known, the distance of the event can be determined from the azimuthal angle that the adjustable mirror has at the moment of the detection (DE4026676 e U.S. Pat. No. 5,218,345).

The present invention adds a novel methodology for this determination, as described hereunder:

In the case the event is visible by a single tower, the distance can be further determined by adjusting the focus of the telescope. The focusing adjustment allows the regulation of the distance that is the maximum intensity of luminous radiation to be collected. The determination of the distance of the event is achieved by the determination of the focusing, where the maximum intensity of the spectrum corresponding to smoke is obtained.

The invention claimed is:

1. System for automatic detection of forest fires through optic spectroscopy characterized in that it comprises an optical system for the detection of the electromagnetic radiation originated from the observed horizon; composed of a mirror (1) with the ability to make a rotation of 360° and with azimuth adjustment, which redirects the light collected from the horizon, mounted over the main lens of a telescope (2) with a modified eyepiece so that the light gathered is transmitted by means of an optical fiber (3); a spectrometer for carrying out the atmospheric chemical analysis from the electromagnetic radiation detected (4); an optical fiber (3) for the optical connection between the spectrometer and the optical detection system; an autonomous system for the analysis of the electromagnetic radiation spectra, for identification of smoke originated from fires, by means of comparison between the spectra measured at the moment and the reference spectra (5) and a system to determine the distance where the smoke is, by focusing the telescope at the location in the horizon where the intensity of the smoke signal is greatest.

2. System for automatic detection of forest fires through optic spectroscopy according to claim 1, characterized in that it uses an optical detection system that comprises a fixed telescope vertically assembled, associated to a rotating 360° mirror and with azimuth adjustment, mounted over the telescope.

3. System for automatic detection of forest fires through optic spectroscopy according to claim 1, characterized in that it includes an autonomous system for the detection of smoke wherein for each point of the horizon a measurement of the current spectrum is obtained from which is subtracted the reference measurement, the result being compared by means of calculation of correlation coefficient with the spectrum of standard smoke subtracted from the spectrum of reference.

4. System for automatic detection of forest fires through optic spectroscopy according to claim 1, characterized in that it determines the distance between the smoke originated from the fire by focusing the telescope at the location in the horizon where the intensity of the smoke signal is the greatest.

5. System for automatic detection of forest fires through optic spectroscopy according to claim 2, characterized in that the optical detection system is mounted on an observation tower located above the tree tops or any other obstacle that obstructs the collection of the electromagnetic radiation in the radius of observation intended, the movement of the mirror being programmed so that the observation angle is always above the horizon line.

6. System for automatic detection of forest fires through optic spectroscopy, according to claim 3, characterized in that the reference spectrum is the one obtained in a confirmed non-fire situation and the smoke spectrum is the one obtained in a confirmed fire situation.

7. System for automatic detection of forest fires through optic spectroscopy according to claim 3, characterized in that an event is considered a real fire when the correlation coefficient value between the two spectra is above 0.9.

* * * * *

UNITED STATES PATENT AND TRADEMARK OFFICE

CERTIFICATE OF CORRECTION

PATENT NO. : 7,656,534 B2
APPLICATION NO. : 11/994711
DATED : February 2, 2010
INVENTOR(S) : Pedro Manuel Cardoso Vieira et al.

It is certified that error appears in the above-identified patent and that said Letters Patent is hereby corrected as shown below:

Title Page, item (73) Assignee: delete the word "Univeridade" and insert -- Universidade --.

Signed and Sealed this

Thirteenth Day of April, 2010

David J. Kappos

David J. Kappos
*Director of the United States Patent and Trademark Office*